United States Patent
Stach

(10) Patent No.: US 8,234,716 B2
(45) Date of Patent: Jul. 31, 2012

(54) METHOD FOR USER DATA TRANSMISSION

(75) Inventor: Thomas Stach, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 1253 days.

(21) Appl. No.: 11/921,410

(22) PCT Filed: Feb. 7, 2007

(86) PCT No.: PCT/EP2007/051185
§ 371 (c)(1),
(2), (4) Date: Nov. 30, 2007

(87) PCT Pub. No.: WO2007/113031
PCT Pub. Date: Oct. 11, 2007

(65) Prior Publication Data
US 2009/0138705 A1    May 28, 2009

(30) Foreign Application Priority Data
Mar. 30, 2006  (EP) .................................. 06006790

(51) Int. Cl.
*G06F 17/30* (2006.01)
(52) U.S. Cl. ............................ 726/30; 713/151; 370/352
(58) Field of Classification Search .................. 713/151; 370/352, 252; 726/30; 725/30
See application file for complete search history.

(56) References Cited

U.S. PATENT DOCUMENTS

| 7,076,653 | B1 * | 7/2006 | Remer et al. .................. 713/155 |
| 7,701,927 | B2 * | 4/2010 | Stampfl et al. ................ 370/352 |

| 2004/0158704 | A1 | 8/2004 | Oates et al. |
| 2005/0111459 | A1 | 5/2005 | Stampfl et al. |
| 2006/0039356 | A1 | 2/2006 | Rao et al. |

FOREIGN PATENT DOCUMENTS

| DE | 103 37 293 A1 | 3/2005 |
| DE | 103 54 947 A1 | 6/2005 |
| EP | 1078649 | 3/2008 |
| FR | 2 812 152 | 1/2002 |
| WO | WO 98/57599 | 12/1998 |
| WO | WO 02/24254 | 3/2002 |
| WO | 2005/020534 | 3/2005 |

OTHER PUBLICATIONS

International Search Report for Application for PCT/EP2007/051185; mailed Apr. 4, 2007.
European Search Report, completed May 18, 2006 and issued in corresponding European Patent Application No. 06 00 6790.

* cited by examiner

*Primary Examiner* — Eleni A Shiferaw
*Assistant Examiner* — Paul Callahan
(74) *Attorney, Agent, or Firm* — Staas & Halsey LLP

(57) ABSTRACT

A first communication device used for a coding enables a direct connection installation message and a coded message to be transmitted in the direction of a second communication device. The direct connection installation message is a first direct connection address identifying a coding device and a coding message is allocated to a second direct connection installation message identifying the first communication device. If it is determined that the second communication device assists the provided coding, a direct connection between the second and the first communication device is established using the second direct connection address. Otherwise, a direct connection between the second communication device and the coding device is established using the first direct connection address and is routed from there to the first communication device.

9 Claims, 1 Drawing Sheet

METHOD FOR USER DATA TRANSMISSION

CROSS REFERENCE TO RELATED APPLICATIONS

This application is based on and hereby claims priority to European Application No. 06006790.7 filed on 30 Mar. 2006, the contents of which are hereby incorporated by reference.

BACKGROUND

Described below is a method for transmitting user data between a first communication device, which uses encryption, and a second communication device.

In modern communication systems, realtime voice or video communication frequently takes place over one or more packet-switched, particularly internet protocol based networks. Such a type of voice or video communication is frequently also referred to as VoIP (VoIP: Voice/Video over Internet Protocol).

Since many packet-switched networks, such as the Internet for example, do not on their own initiative offer any reliable protection against listening in by unauthorized persons, provision is frequently made in the case of VoIP communication to encrypt on the user side the voice or video data to be transmitted. In many, particularly heterogeneous, communication systems the particular encryption requirements can however vary from user to user. Thus in a communication system there frequently exist both users who can communicate only in unencrypted fashion, and also users who can communicate in encrypted or unencrypted fashion, and also users who can communicate only in encrypted fashion.

A VoIP communication is frequently routed by way of a plurality of different communication networks. The different communication networks are as a rule coupled to one another by so-called gateway facilities which in the context of the VoIP communication carry out a conversion of the user data to be transmitted with regard to the transfer between the communication networks. Such conversions do however as a rule have a disadvantageous effect on the transmitted voice or video quality.

In order to avoid such a degradation of the voice or video quality, provision can be made to set up a user data direct connection between the communicating users, by which the gateway facilities can at least be logically bypassed. Such a setup of a direct connection is also known as a "Direct Media Connection".

A direct connection between users having incompatible encryption requirements and capabilities is however not easily possible.

SUMMARY

An aspect is to set down a method for transmitting user data which is more flexible in respect of the encryption requirements and capabilities of the communication devices.

For the purpose of transmitting user data between a first communication device, which uses encryption, and a second communication device, the first communication device initiates the transfer in the direction of the second communication device of a direct connection setup message and also an encryption message. In this situation, the direct connection setup message is transferred with a first direct connection address, an IP address for example, identifying an encryption device. The encryption message is transferred with a second direct connection address, an IP address for example, identifying the first communication device. The first and/or the second communication device can for example be implemented by a terminal device, a personal computer, a so-called IP telephone, a switching facility or a switching facility with attached terminal device. If it is determined on the basis of the transferred encryption message that the second communication device supports the specified encryption, a direct connection is set up between the second and the first communication device on the basis of the second direct connection address. The user data is then transmitted over the established direct connection in encrypted form. If this determination does not take place, a direct connection is set up between the second communication device and the encryption device on the basis of the first direct connection address. The user data is transmitted by way of the established direct connection to the encryption device and forwarded by the latter in encrypted form to the first communication device.

This permits flexible communication between communication devices having different encryption requirements and capabilities by advantageously utilizing direct connections.

The method described below is backward compatible insofar as the second communication device, if it does not have the corresponding encryption capability, does not need to be able to recognize or interpret the encryption message in order to obtain the first direct connection address required as the destination address for communication with the encrypting first communication device. Since the first direct connection address, identifying the encryption device, is contained in the direct connection setup message, existing communication devices which are non-encrypting but have a direct connection capability, which as a rule ignore the encryption message, can continue to be used unchanged by this method.

According to an advantageous embodiment, the transfer of the direct connection setup message and also of the encryption message can take place in the context of setting up a first connection between the first or second communication device. Such a type of first connection is frequently also referred to as a master call. Accordingly, a slave call assigned to such a master call in the context of a "Direct Media Connection" can be set up as a direct connection.

The first connection can be set up as a conventional call, using a destination number for example, from the first to the second communication device. In particular, the first connection can be set up by a connection controller and be routed by way of one or more gateway facilities and over different networks. In the context of the first connection, connection data relevant to the setup of the direct connection can be transferred with the direct connection setup message and the encryption message, as a result of which the communication devices are able to set up the direct connection whilst bypassing the gateway facility. If the second communication device supports the specified encryption, the direct connection can be set up directly between the two communication devices.

According to a further advantageous embodiment of the method, the encryption device can be implemented in the gateway facility. This is advantageous insofar as the encryption device is able to directly access connection data present in the gateway facility by way of the first connection for the purpose of forwarding the direct connection.

According to a further embodiment, the direct connection can be assigned to the first connection, whereby the assignment is stored in the encryption device. In this case, the encryption device can ascertain the first communication device as the end point of the first connection assigned to the direct connection and forward user data arriving over this direct connection to the thus ascertained end point, namely the first communication device. The encryption device can in this case derive connection data essential to the forwarding of the direct connection from connection data for the first connection.

Advantageously, the first connection can exist parallel to the direct connection, with the result that the transmitting user data can if necessary switch from the direct connection to the first connection and/or vice versa.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
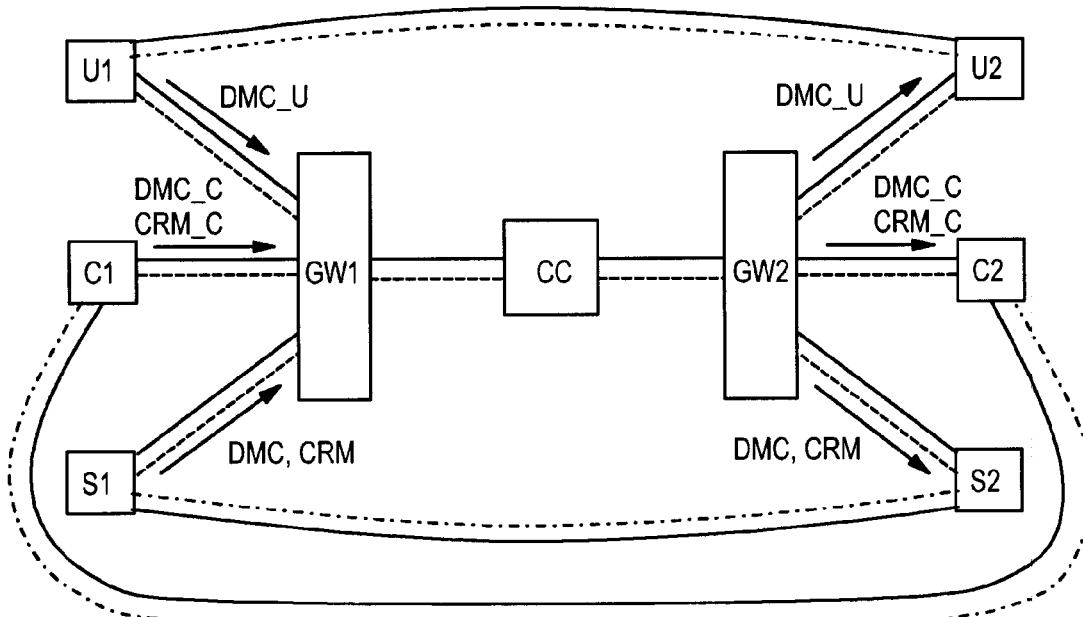
FIG. 1 is a block diagram providing a schematic representation of a communication system with communication devices having different encryption requirements.

Reference will now be made in detail to the preferred embodiments, examples of which are illustrated in the accompanying drawings, wherein like reference numerals refer to like elements throughout.

FIG. 1 shows a schematic representation of a communication system with different communication devices U1, C1, S1, U2, C2 and S2, which are connected by way of different networks (not shown explicitly) coupled through gateways GW1 and GW2. The communication system in the present exemplary embodiment is assumed to be IP based (IP: Internet Protocol). The communication devices U1, C1, S1, U2, C2 and S2 can for example be implemented as a user terminal device, a VoIP telephone (VoIP: Voice/Video over IP), a personal computer, a communication client or as a switching system, particularly a so-called PBX (Private Branch Exchange) with attached user terminal devices or VoIP telephones, and for example be provided for the purposes of voice or video communication, preferably in real time. It is assumed by way of example for the present exemplary embodiment that the communication devices U1, C1, S1, U2, C2 and S2 are used for VoIP realtime voice communication and voice data is correspondingly to be transmitted as user data.

While the communication devices U1, C1 and S1 are attached to the gateway GW1, the communication devices U2, C2 and S2 are attached to the gateway GW2. Both gateways GW1 and GW2 are coupled to a call control facility CC, which also includes a direct connection control facility. Such a call control facility is frequently is referred to as "Call Control" and such a direct connection control facility also as "DMC Control" (DMC: Direct Media Connection).

It is furthermore assumed that the communication devices U1, C1, S1, U2, C2 and S2 have different encryption requirements and encryption capabilities. By way of example, it is assumed that the communication devices U1 and U2 are unable to perform any voice encryption, that the communication devices C1 and C2 are able to send and receive both encrypted and also unencrypted voice data, and that the communication devices S1 and S2 are protected inasmuch as they may send and receive solely encrypted voice data.

In the communication system the Direct Media Connection method is used in order to optimize the voice quality of a VoIP call. In the context of such a VoIP call two separate connections, but connections which are correlated with one another and associated with one another, are set up which exist in parallel. As the first connection, a so-called master connection (master call) is set up which is used in order to basically set up the VoIP call. Through the master call, setup of the second connection as a so-called slave connection (slave call) is initiated, through which a direct user data connection is set up between the VoIP call partners. The master call is preferably a conventional call which is set up by a conventional call number to the particular communication device called.

FIG. 1 illustrates a setup of master and slave calls between communication devices having the same encryption requirements and capabilities, in other words a communication between the communication devices U1 and U2, between the communication devices C1 and C2 or a communication between the communication devices S1 and S2.

In order to set up the respective master call, signaling is conducted between the communication device U1, C1 or S1 and the communication device U2, C2 or S2 respectively by way of the gateway GW1, the call control CC and also the gateway GW2. The user data for the master call is carried over the same route. The signaling is illustrated in FIG. 1 by solid lines and the user data transfer for the master call by broken lines. The call control CC is controlled by the master call.

The network components GW1, CC and GW2 can also be multiply arranged one behind the other in heterogeneous communication systems, such as GW1-CC-GW2- . . . -GW(N-1)-CC(N-1)-GW(N) for example. As a rule, the voice data to be transmitted experiences a transformation and/or a code conversion in each case in at least one or all of the transit gateways, which has a disadvantageous effect on the voice quality. In order to avoid such types of possibly multiple conversions, in the case of an existing master call the slave call is set up in parallel as a direct connection, on which the voice data can be transmitted directly between the calling communication device U1, C1 or S1 and the called communication device U2, C2 or S2 respectively. In order to provide the call partners U1 and U2, C1 and C2 or S1 and S2 with information as to the destination of the respective slave call, IP addresses of the relevant call partners are exchanged during setup of the master call. The IP addresses are transferred within direct connection setup messages, for example so-called DMC messages.

In FIG. 1 the communication device U1 transfers a direct connection setup message DMC_U with its IP address to the communication device U2. The communication device C1 sends a direct connection setup message DCM_C with its IP address to the communication device C2 and the communication device S1 sends a direct connection setup message DMC with its IP address to the communication device S2. In the case of a communication between communication devices having the same encryption requirements, the direct connection setup messages DMC_U, DMC_C and DMC thus in each case contain that IP address to which the relevant recipient of this IP address can directly transfer voice data. Such direct connection setup messages can as a rule be correctly interpreted both by existing communication devices having encryption and also by existing communication devices having no encryption capabilities.

In the case of the potentially encrypting communication devices C1 and C2 and the mandatorily encrypting communication devices 51 and S2, encryption messages CRM_C and CRM are additionally transferred between the respective communication partners during setup of the master call. FIG. 1 illustrates a transfer of the encryption message CRM_C from the communication device C1 by way of the gateway GW1, the call control CC and the gateway GW2 to the communication device C2 and also a transfer of the encryption message CRM from the communication device S1 by way of the gateway GW1, the call control CC and the gateway GW2 to the communication device S2. While the encryption message CRM_C specifies the encryption capabilities and encryption requirements of the communication device C1, the encryption message CRM specifies the encryption capabilities and encryption requirements of the communication device S1. On the basis of the encryption message CRM_C or CRM the respective recipient can determine whether its encryption capabilities correspond to the encryption requirements specified in each case, and if this is the case set up a correspondingly encrypted slave direct connection.

The slave calls illustrated by FIG. 1 are set up whilst at least logically bypassing both gateways GW1 and GW2 directly between the respective communication partners U1 and U2, C1 and C2 or S1 and S2. Such a type of logical bypass can be implemented for example by a tunnel connection passing via the gateways GW1 and/or GW2, through which a conversion of user data in GW1 and/or GW2 is avoided. The signaling for a relevant slave call is illustrated in FIG. 1 by solid lines, the user data transmission by dot and dash lines.

The aforementioned assignment of a particular slave call to its master call is managed by the call control CC and stored in the gateways GW1 and GW2.

Figure 2:
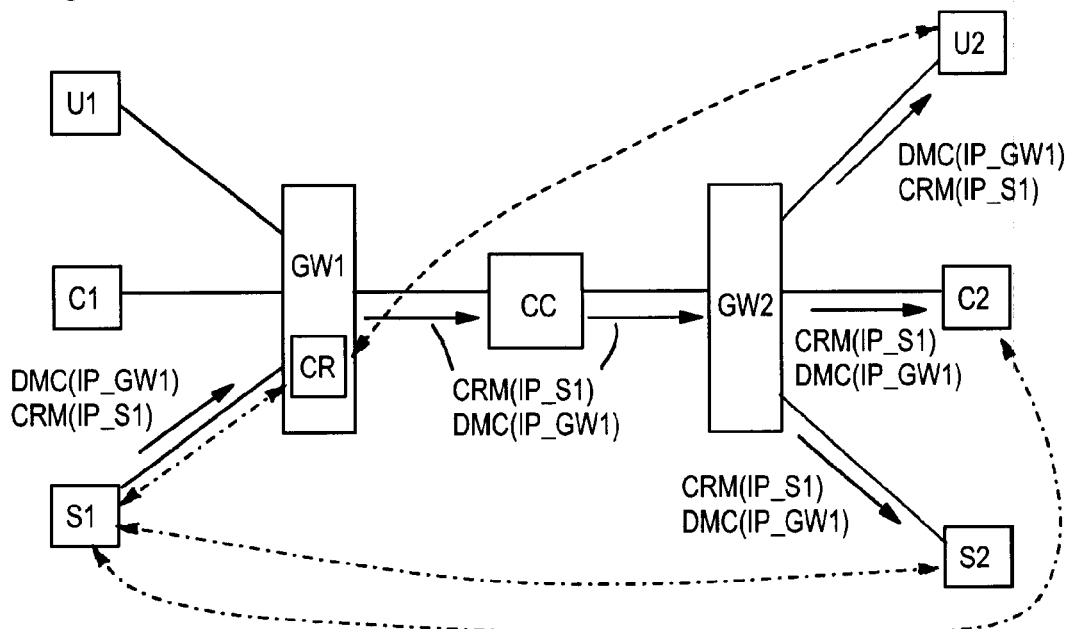
FIG. 2 is a block diagram providing a schematic representation of the communication system with regard to a communication between communication devices having different encryption requirements

FIG. 2 shows a schematic representation of the communication system illustrated in FIG. 1 with regard to a communication between communication devices having different encryption requirements and encryption capabilities. Identical reference characters have the same meaning in FIG. 2 as in FIG. 1.

FIG. 2 illustrates by way of example the routing of user data connections which originate from the communication device S1 that is communicating only in encrypted fashion.

In concrete terms, a first user data connection between the communication devices S1 and S2, a second user data connection between the communication devices S1 and C2 and also a third user data connection between the communication devices S1 and U2 are considered in the following. The communication device S1 can exchange the user data directly in encrypted form with the similarly encrypting communication devices C2 and S2. In the case of the user data connection between S1 and U2 this is however not easily possible because the communication device S2 is only permitted to send and receive in encrypted form but the communication device U2 has no encryption capabilities. Nevertheless, in order to set up a user data connection between the communication devices S1 and U2 this is routed by way of the gateway GW1, into which is integrated an encryption module CR for encrypting and decrypting voice data. The gateway GW1 consequently acts as an encryption device.

As already described in conjunction with FIG. 1, in order to set up a relevant user data connection, when setting up a relevant master call from the communication device S1 to the communication device S2, C2 or U2 a direct connection setup message DMC and also an encryption message CRM are transferred in each case from the calling communication device S1 to the relevant call destination S2, C2 or U2 respectively. In accordance with the details given above the master calls that have been set up are routed from the calling communication device S1 by way of the gateway GW1, the call control CC and the gateway GW2 to the relevant call destination S2, C2 or U2 respectively.

According to the method, the direct connection setup message DMC includes a direct connection address IP_GW1 which identifies and addresses the gateway GW1 acting as an encryption device. The direct connection address IP_GW1 is inserted into the direct connection setup message DMC as an address addressing the calling end point of the direct connection that is to be set up.

The encryption message CRM includes a direct connection address IP_S1 identifying and addressing the calling communication device S1. By preference, the direct connection address IP_GW1 is an IP address of the gateway GW1 and the direct connection address IP_S1 is an IP address of the communication device S1.

By preference, provision can be made whereby the preceding transfer of two direct connection addresses IP_S1 and IP_GW1 is only initiated in the case of specially protected communication devices, as here the mandatorily encrypting communication device S1. In particular, provision can be made whereby communication devices that are not specially protected, here U1 and C1, transfer a direct connection address identifying itself in a direct connection setup message when setting up a master call.

In the case of the specially protected communication device S1 the IP address of the gateway GW1 is entered into the direct connection setup message DMC because at the beginning of call setup it is not yet know which encryption capabilities the communication device S2, C2 or U2 called in each case has and because the gateway GW1 can perform an encryption and decryption standing in to a certain extent as a communication device having no encryption capability, here U2.

However, in order to also allow the communication device S1 to set up encrypted direct connections to communication devices having an encryption capability, here C2 and S2, the IP address IP_S1 is transferred as a second IP address with the encryption message CRM. The communication devices C2 and S2 having an encryption capability can—unlike the communication device U2—recognize and process the received encryption message CRM.

The communication devices C2 and S2 can thus initially check in each case on the basis of the encryption message CRM whether they satisfy the encryption requirements of the communication device S1. If this is the case, as in the present embodiment, the communication devices C2 and S2 can discard the direct connection address IP_GW1 contained in the direct connection setup message DMC and instead use the direct connection address IP_1 contained in the encryption message CRM in order to initiate the setup of an encrypted slave direct connection between C2 and S1 or S2 and S1.

If on the other hand the communication device C2 or S2 were to ascertain on the basis of the encryption message CRM that it did not satisfy the encryption requirements of the communication device S1, the communication device C2 or S2 could use the direct connection address IP_GW1 contained in the direct connection setup message DMC. On the basis of this, an unencrypted slave call could be set up to the gateway GW1 acting as an encryption device, which could pass on this slave call in encrypted form to the communication device S1.

In FIG. 2, the encrypted slave direct connections between the communication devices S1 and S2 or S1 and C2 are indicated in each case by dot and dash double arrow lines. The two slave direct connections bypass—unlike the master calls on which they are based—the gateways GW1 and GW2 and also the call control CC at least logically.

In the present embodiment, the communication device U2 has no encryption capabilities and can consequently not recognize or interpret the encryption message CRM. On the other hand, the direct connection setup message DMC can be detected and evaluated by the communication device U2.

Since the direct connection setup message DMC contains the IP address IP_GW1 of the gateway GW1 as a direct connection address, this is interpreted by the communication device U2 as the end point of the slave direct connection to be set up and consequently an unencrypted slave direct connection is set up between the communication device U2 and the gateway identified by the IP address IP_GW1. The unencrypted slave direct connection is indicated in FIG. 2 by a dot and dash double arrow line. As a direct connection this slave call at least logically bypasses the gateway GW2 and where applicable further intermediate transit gateways and thus avoids multiple quality-reducing conversions of the voice data compared with connections which pass through all the gateways.

The gateway GW1 encrypts the voice data arriving by way of the slave direct connection from the communication device U2 by the encryption module CR and transmits the voice data in encrypted form by way of a continuation of the slave direct connection from the gateway GW1 to the communication device S1. The encrypted continuation of the slave direct connection between the gateway GW1 and the communication device S1 is indicated in FIG. 2 by a dot and dash double arrow line.

The gateway GW1 ascertains the actual end point, here S1, of the slave direct connection incoming from the communication device U2 by the fact that the master call assigned to this slave call is ascertained and the slave call is continued to the end point of the master call, here S1.

As already mentioned above, it is advantageous if the direct connection address, here IP_1, of the particular communication device to which the slave call is to be set up is only transferred with the encryption message CRM if the transfer of the encryption message CRM is initiated by a specially protected communication device, such as S1.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for transmitting user data between a first communication device, which uses encryption, and a second communication device, comprising:
    initiating transfer by the first communication device towards the second communication device of a direct connection setup message with a first direct connection address identifying an encryption device and an encryption message specifying the encryption with a second direct connection address identifying the first communication device;
    determining, based on the encryption message, whether the second communication device supports the encryption specified;
    if the second communication device supports the encryption specified, setting up a first direct connection between the second communication device and the first communication device based on the second direct connection address, and transmitting the user data over the first direct connection in encrypted form; and
    if the second communication device does not support the encryption specified, setting up a second direct connection between the second communication device and the encryption device based on the first direct connection address and transmitting the user data by way of the second direct connection to the encryption device for encryption and forwarding of the user data in encrypted form to the first communication device.

2. The method as claimed in claim 1, wherein said initiating transfer of the direct connection setup message and the encryption message occurs during setting up an initial connection between the first and the second communication devices.

3. The method as claimed in claim 2, wherein the initial connection is routed by way of a gateway facility and is set up by a connection control facility.

4. The method as claimed in claim 3, wherein either of the first and second direct connections is set up while bypassing the gateway facility.

5. The method as claimed in claim 4, wherein the encryption device is implemented in the gateway facility.

6. The method as claimed in claim 5, further comprising:
    assigning the second direct connection to the initial connection;
    storing an assignment of the second direct connection to the initial connection in the encryption device; and
    ascertaining, by the encryption device, that the first communication device is an end point of the initial connection assigned to the second direct connection prior to the forwarding of the user data arriving over the second direct connection to the first communication device as the end point.

7. The method as claimed in claim 6, wherein the transmitting of the user data by way of the second direct connection switches if necessary from the second direct connection to the initial connection.

8. The method as claimed in 7, wherein the initial connection is a master call is set up in accordance with a direct media connection method.

9. The method as claimed in claim 8, wherein either of the first and second direct connections is a slave call set up in accordance with the direct media connection method.

* * * * *